United States Patent Office 3,171,227
Patented Mar. 2, 1965

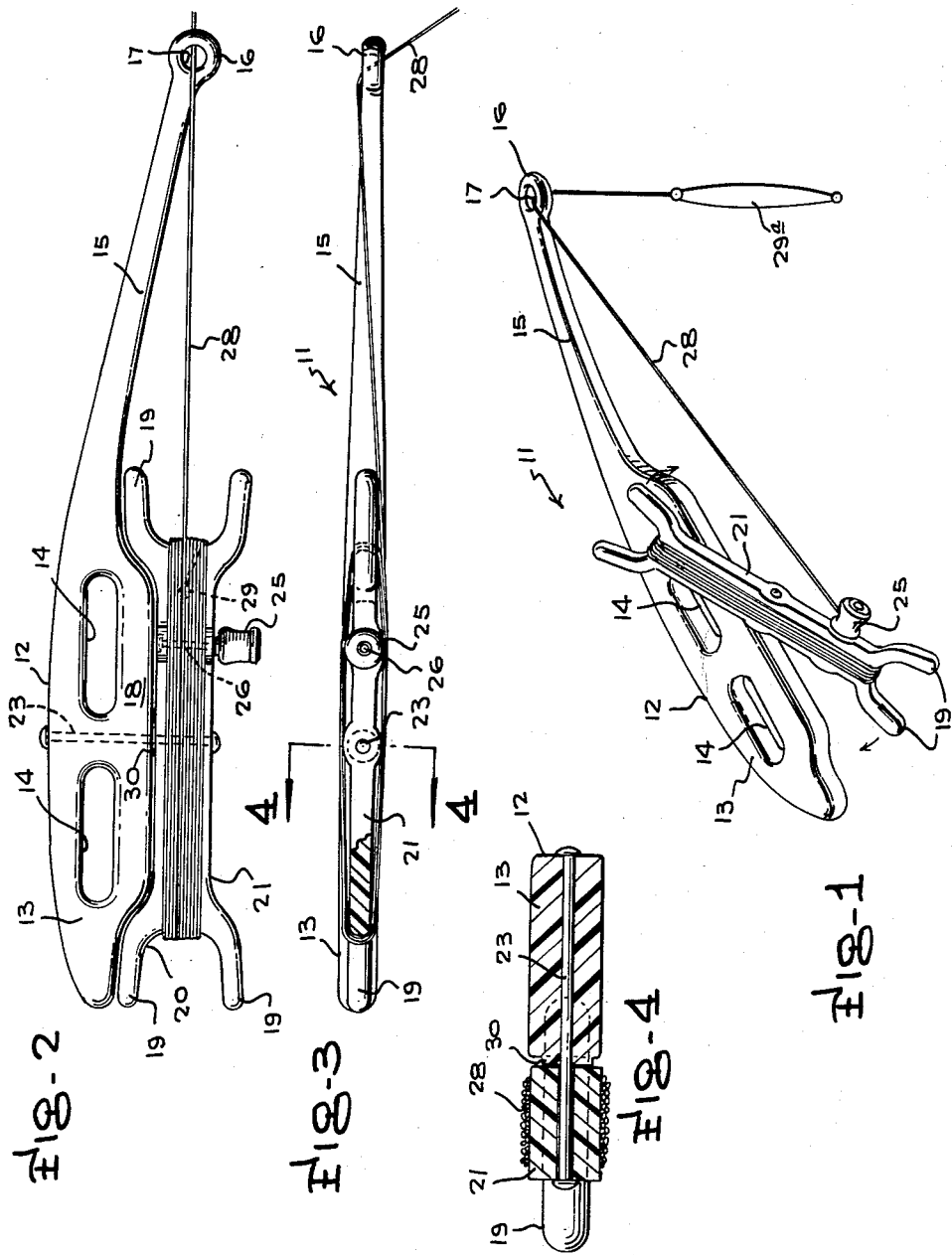

3,171,227
FISHING DEVICE
Max H. Merrill, Main St., North Clarendon, Vt.
Filed Jan. 7, 1964, Ser. No. 336,180
1 Claim. (Cl. 43—20)

This invention relates to fishing rod devices, and more particularly to a combined fishing line-supporting device and winding reel particularly adapted for use in winter fishing through an aperture in the ice.

A main object of the invention is to provide a novel and improved fishing device for supporting a fishing line and for manipulating the line in fishing through ice or similar types of fishing, the device being of relatively simple construction, being easy to handle, and being arranged so that a fishing line carried thereon can be wound or unwound rapidly and with a minimum amount of effort.

A further object of the invention is to provide an improved fishing device in the nature of a fishing line support and winding reel member associated therewith, the device being compact in size, being inexpensive to manufacture, being durable in construction, and being especially suitable for fishing through the ice wherein it is desirable to be able to move the fishing line in a particular manner known as "jigging" to impart a vertical intermittent movement to the base carried at the end of the line, which has proven to be very attractive to fish and which induces fish to bite at the bait.

Further objects and advantages of the invention will become apparent from the following description and claim, and from the accompanying drawings, wherein:

FIGURE 1 is a perspective view of an improved fish-in device constructed in accordance with the present invention.

FIGURE 2 is an enlarged top plan view of the fishing device of FIGURE 1.

FIGURE 3 is a side elevational view, partly in vertical cross section, of the fishing device shown in FIGURE 1.

FIGURE 4 is an enlarged transverse vertical cross sectional view taken substantially on the line 4—4 of FIGURE 3.

Refering to the drawings, 11 generally designates an improved fishing device according to the present invention. The device 11 comprises an elongated flat rigid main body 12 which may be fabricated from any suitable material, such as molded plastic, or the like, the body 12 having the widened main portion 13 formed with the gripping apertures 14 which may comprise elongated longitudinally extending slots, as shown, and being further formed with a forwardly extending laterally inclined elongated finger portion 15 provided at its end with the ring 16 defining a line guide aperture 17.

As shown in FIGURE 2, the main body 12 is formed with a laterally offset edge portion 18 which projects in the same direction as the laterally inclined finger 15. Designated at 21 is a flat elongated reel member, which may be formed of the same material as the main body 12, the reel member being provided at its opposite ends with the outwardly offset spaced fingers 19, 19 defining line retaining notches 20 therebetween. The flat reel member 21 is pivotally connected at its mid portion to the main body 13 by a transverse rivet 23 coplanar with both the body 13 and the reel member 21. As shown in FIGURE 2, the inwardly offset edge portion 18 of body 13 substantially fits into the space defined along the longitudinal edge of the reel member 21 between the inner pair of finger members 19 at the opposite ends of the reel member. This feature makes it possible to arrange the reel member 21 in coplanar relationship with the main body 13 of the fishing device, whereby to define a substantially flat article which can be easily stored or transported.

Designated at 25 is a handle knob which is rotatably connected to the outer side edge portion of the reel member 21, for example, by a transversely extending pivot bolt 26, the handle knob 25 being spaced longitudinally a substantial distance from the transverse pivot element 23.

The median longitudinal plane of the reel member 21 is aligned with and extends through the aperture 17.

Designated at 28 is a fishing line which is secured at one end to the reel member 21, said reel member being formed with an aperture 29 to facilitate said securement, the fishing line being wound longitudinally around the reel member 21, the respective turns of the line being received between the spaced pairs of fingers 19, 19 at the opposite ends of the reel member, namely, in the notches 20 thereof. The fishing line extends through the guide aperture 17, and may be provided at its free end with a sinker 29a and with suitable hooks not shown.

As previously explained, the inwardly projecting marginal portion 18 of main body 13 fits into the space between the offset fingers 19, 19 at the inner side of the reel member 21, so that the reel member is freely rotatable relative to the main body 13. Thus, in handling the device, the user holds the gripping portion of the main body 13, namely, the portion containing the gripping apertures 14, 14, and manipulates the reel member 21 by means of the winding knob 25. For example, in lowering the line through a hole in the ice, the line can be lowered by unwinding same from the reel 21. This can be accomplished by allowing the line to unwind itself, it being merely necessary to hold the main body 13 at its apertured gripping portion, while allowing the reel member 21 to rotate to unwind the fishing line 28 therefrom. The line may previously be looped around one of the fingers 19, for example, by employing a half hitch or similar type of loop, at a point thereon corresponding to the desired length of line to be unwound. Thus, as the line unwinds, when the desired depth is reached, the reel 21 automatically stops rotating, and the line is held at the desired depth.

To wind up the line, it is merely necessary to rotate the reel member 21, using the winding knob 25. As will be readily understood, once the proper depth for a given fishing hole has been determined, the line can be looped with a half hitch over a finger 19 at a point corresponding to the correct length of line to be unwound, so that each time the line is dropped through the hole and allowed to unwind, it will automatically unwind to the proper depth. Also, as above explained, only one hand is necessary for this operation, since it is merely necessary to hold the main body 13 and allow the reel element 21 to rotate freely to unwind the fishing line therefrom.

When the line is to be wound up, the user holds the main body 13 with one hand and with the other hand rotates the reel member 21 by means of the knob 25, thereby winding up the fishing line on the reel member 21.

The line winds and unwinds smoothly, since the elongated reel member 21 is substantially longitudinally aligned with the fishing line guide aperture 17.

A small clearance is preferably provided between the elongated reel member 21 and the adjacent edge portion of the main body 13. This may be obtained by the provision of an integral spacer boss 30 on the edge of the inwardly offset portion 18 around the bore receiving the pivot member 23, as shown in FIGURE 4, or alternatively, a spacing washer may be employed at this point to provide the desired small clearance.

While a specific embodiment of an improved fishing device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fishing device comprising an elongated flat rigid main body having a forwardly extending laterally inclined finger portion provided with a guide ring at its end coplanar with said main body and defining a guide aperture at the end of said finger portion, a flat elongated reel member, pivot means connecting said reel member to the rear portion of said body on an axis transverse to and coplanar with both said body and said reel member, said reel member being provided with laterally offset spaced guide fingers on its opposite ends, said reel member being substantially longitudinally aligned with said guide aperture, said main body having a laterally offset edge portion substantially fitting into the space defined along the longitudinal edge of the reel member between the inner pair of laterally offset guide fingers thereof, a handle knob rotatably connected to the side edge of said flat reel member opposite said main body at a location spaced from said pivot means, and a fishing line secured to said reel member and wound longitudinally thereon, passing between said spaced guide fingers and through said guide aperture.

References Cited by the Examiner

UNITED STATES PATENTS

| | | | |
|---|---|---|---|
| 2,561,237 | 7/51 | Shafer | 43—20 X |
| 2,826,852 | 3/58 | Wardrip | 43—22 |
| 3,080,673 | 3/63 | Smith | 43—22 |

FOREIGN PATENTS

| | | |
|---|---|---|
| 124,299 | 3/49 | Sweden. |

ABRAHAM G. STONE, *Primary Examiner.*